Oct. 27, 1970

J. R. JOHANSON 3,536,303

MATERIAL BLENDING APPARATUS

Filed Aug. 7, 1968

INVENTOR.
JERRY R. JOHANSON

By Frank C. Manak III

Attorney

_United States Patent Office_

3,536,303
Patented Oct. 27, 1970

3,536,303
MATERIAL BLENDING APPARATUS
Jerry R. Johanson, Monroeville, Pa., assignor to United
States Steel Corporation, a corporation of Delaware
Filed Aug. 7, 1968, Ser. No. 750,920
Int. Cl. B01f 5/00
U.S. Cl. 259—180                                   3 Claims

ABSTRACT OF THE DISCLOSURE

Apparatus for blending either liquids or granular solids. The apparatus employs a gravity flow technique of blending, and requires no moving parts. The preferred embodiment of the invention includes a number of conical chutes stacked one above the other with their vertical axes offset from one another. The materials to be mixed are poured into the top chute and blend as they flow downward through successive chutes. The resulting blend is substantially homogeneous. A moving conveyor belt below the bottom chute carries away the blended material.

---

This invention relates to apparatus for blending either liquids or granular solids. The purpose of the apparatus is to blend at least two separate flowable materials to create a substantially homogeneous mixture.

Previous methods and apparatus for blending flowable materials have included rotating drums, oscillating containers, moving blades or stirring impellers, and ribbon mixers. All the foregoing have the disadvantage of requiring moving mechanical parts to accomplish the blending.

There have also existed for a long time various types of gravity-flow blending apparatus, which accomplish the blending without the aid of moving parts. Examples of gravity-flow devices for blending solid granular materials are shown in U.S. Pat. No. 633,313, issued to P. C. Hains, Jr. and C. R. Weaver and U.S. Pat. No. 3,275,304, issued to L. P. Brundrett. These devices operate by use of stationary material-conveying surfaces which are placed to direct the particles of material to spread out and feed together alternately a number of times. Such devices mix the material, particularly if the process is repeated over and over again. However, the degree of their efficiency depends on their exact mechanical design.

The presently known gravity blending devices have exhibited a variety of shortcomings which keep down their blending efficiencies. By blending efficiency I mean the degree to which an apparatus can produce a homogeneous blend from two kinds of separated materials, either in a given number of transfers from one conveying surface to another, or in any number of such transfers. One factor which reduces the blending efficiency of gravity blenders is the accumulation of material at various stages in its flow. Another is the relatively long, complex path required in some mixers for both spreading and bringing together the components of the material stream. Still another factor is the critical angle at which the conveying surfaces are positioned with respect to the horizontal. Either a too shallow or too steep an angle cause insufficient mixing action among the components of the stream.

An object of my invention is to provide apparatus for blending granular solids or liquids, which accomplishes a gravity flow blending more efficiently than the previously known apparatus.

Another object of my invention is to provide a material blending apparatus that is of simple construction and is easy to build.

My apparatus improves upon the previous means in many ways which affect blending efficiency, including those mentioned above. The full advantages of my apparatus will be more apparent from the following detailed description of my invention and the attached drawings, in which.

Figure 1:
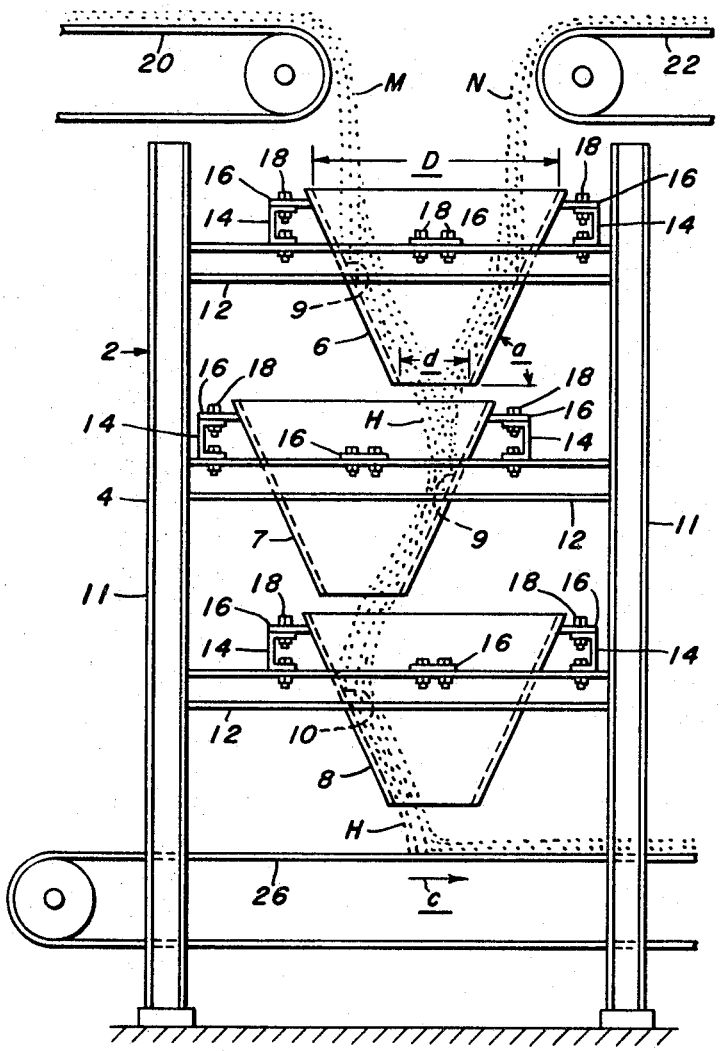
FIG. 1 is a side elevation of material blending apparatus showing one embodiment of my invention.
Figure 2:
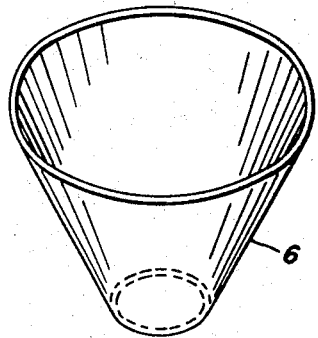
FIG. 2 is a perspective view of a portion of the apparatus of FIG. 1.

Referring to FIG. 1, apparatus 2 includes a frame 4 and a plurality of inverted conical chutes 6, 7 and 8. The apparatus receives streams of different materials M and N in the top chute 6, and blends these materials into a single, substantially homogeneous stream of material H which falls from the bottom of chute 8. Each of the chutes 6, 7 and 8 is horizontally offset from its adjacent chute or chutes, so that there is no direct vertical path for material falling through all of the chutes. The materials are received by chutes 7 and 8 on material flow receiving areas 9 and 10, respectively, of the inner concave conical surface of each chute. While three chutes are shown in FIG. 1, any number of chutes more than one may be used. Of course, the number of chutes required for any particular application of the apparatus depends on the degree of material blending desired.

In the preferred embodiment, the chutes 6, 7 and 8 are of the same size and shape. The chutes are designed to obtain a maximum amount of blending of the materials M and N, while maintaining a uniform free flow of these materials so that they do not back up in the chutes. In order to obtain a maximum blending in as short a space as possible, a chute angle $\underline{a}$ (FIG. 1) of $65°\pm7°$ has been found to be the most desirable. Also, desirable for maximum blending is a small diameter $\underline{d}$ for the bottom opening of each chute 6, 7 and 8 (FIG. 1). However, too small a diameter $\underline{d}$ will cause material backup in the chutes. The minimum diameter $\underline{d}$ for preventing such material backup will depend on the desired flow rate of the material through the chutes, on the average density of the materials, and in the case of blending liquids, the average viscosity of such liquids. For example, in the case of granular solids where a chute having a chute angle $\underline{a}$ of $65°$ is used, the minimum diameter $\underline{d}$ for the bottom opening of the chute should be the following:

$$\underline{d} = 0.623 \ (Q/\underline{b})^{2/5} \text{ ft.}$$

where Q is the maximum flow rate through the apparatus 2 in lbs./sec. and $\underline{b}$ is the bulk density in the bulk solid lbs./cu. ft. In order to obtain maximum blending of the materials as they travel downward through each chute, the top diameter $\underline{D}$ of the chute should be approximately 3.5 times the bottom diameter $\underline{d}$. A larger diameter is not warranted because it would not substantially improve the blending of materials in the chute.

The frame 4, which supports the chutes 6, 7 and 8, comprises upright columns 11 and horizontal beams 12 and 14. The chutes are removably supported on the horizontal beams 12 and 14 by means of flanges 16, which are welded to the sides of the chutes and bolted to the beams 12 and 14 by bolts 18. If desired, shims may be placed between the flanges 16 and the beams 12 and 14 to adjust the vertical spacing of the chutes from one another. Generally, the bottom of one chute should be spaced from the top of the next lower chute by a distance equal to one-fourth the diameter $\underline{D}$ of the opening in the bottom chute. Such a spacing will insure enough fall of the material from one chute to the next to produce a maximum amount of blending, without causing material to spill outside the chutes.

A suitable means for introducing materials M and N into the top chute 6 is illustrated in FIG. 1 by conveyor belts 20 and 22. These belts are shown by way of illustration only, and other means may be used for introducing the materials, such as chutes or hoses.

At the bottom of the apparatus 8, a conveyor belt 26 carries away the blended material H falling from the bottom chute 8. Again, any type of conveying means may be used in place of belt 26. Preferably, the conveying means moves away the material H in the same direction as the horizontal velocity component given the material by the final chute 8 (arrow c, FIG. 1). This provides for a smooth transfer of the material to its conveying means and minimizes the disruption of the homogeneous consistency attained in the material passing through the apparatus 2.

In operation, two different types of granular materials M and N are fed into the top chute 6 from conveyor belts 20 and 22 as shown in FIG. 1. It is preferred, but not necessary, that the two materials be introduced on diametrically opposed sides of the chute 6. The materials M and N fall downward through the chute and come together at the bottom of chute 6, where they form a single stream H. At this point, the materials, although together, are in a substantially unblended state. As they fall together onto the material flow receiving area 9 of the concave conical surface of chute 7, the materials spread out laterally. Then, by virtue of the conical shape of the chute 7, the materials flow together as they fall toward the bottom of chute 7, causing a blending of the two different types of particles M and N. The result is a more homogeneous consistency of the stream H at the bottom of chute 7 than at the top of chute 7.

The material B then falls from the bottom of chute 7 onto the material flow receiving area 10 of chute 8. The impact from this fall causes spreading action similar to that occurring in chute 7, and the blending process in chute 7 is repeated over again in chute 8. Then the blended material H falls from the bottom of chute 8 onto the belt 26 which carries the material B away in the direction of arrow c.

Figure 3:
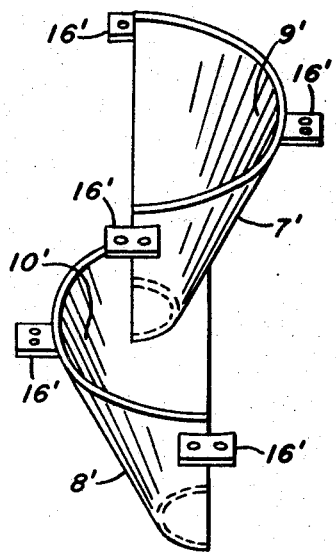
FIG. 3 is a perspective view of a portion of material blending apparatus illustrating a second embodiment of my invention.

Alternative chutes 7' and 8' are shown in FIG. 3. These chutes may be used in place of chutes 7 and 8 of FIG. 1. Unlike the chutes 6, 7 and 8, the walls of the chutes 7' and 8' do not completely envelop the material passing through them. However, these chutes do have the other features of chutes 7 and 8, including inner concave conical surfaces with material flow receiving areas 9' and 10'. Chutes 7' and 8' are as capable as chutes 7 and 8 of a blending of the different particles of material stream H, under normal operating conditions. One disadvantage of chutes 7' and 8' is that they would not provide as much protection against overflow or spillage should the flow rate of material H greatly exceed normal operating conditions. When chutes 7' and 8' are used, it is recommended that the top chute be a fully enveloping conical chute, such as chute 6 in FIG. 1. The chute is the most convenient for receiving the two separate materials M and H.

Naturally, it should be understood that various modifications to the apparatus 2 may be made without departing from the scope of the invention. For instance, a greater number of chutes may be provided than the three chutes shown in FIG. 1, in order to obtain an even more homogeneous consistency of material H. Also, means may be provided for more easily adjusting the vertical spacing of the chutes, such as by mounting each chute on a carriage that is adjustable vertically on the frame 4 by a rack and pinion arrangement.

I claim:
1. Apparatus for blending two separate flowable materials together comprising:
   an upright frame,
   a plurality of chutes supported one above the other on said frame,
   each of said chutes having:
      a bottom edge and a top edge,
      a concave conical surface disposed between said bottom edge and said top edge and having a relatively large radius of curvature near said top edge and relatively small radius of curvature near said bottom edge, and
   a material flow receiving area on said surface,
   the material flow receiving area of each chute that is beneath a higher chute being disposed beneath the bottom edge of said higher chute so as to receive material flowing therefrom,
   said chutes being relatively positioned such that a line between the material receiving area and the bottom edge of each chute is at a substantial angle to the corresponding lines between the material receiving areas and the bottom edges of the immediately higher and immediately lower chutes.
2. Apparatus of claim 1 wherein said chutes are in the form of inverted hollow truncated cones, each cone having an opening at both ends and disposed with its axis substantially vertical and offset horizontally from the axes of the immediately adjacent cones.
3. Apparatus of claim 2 wherein said line between the material receiving area and the bottom edge of each of said truncated cones is inclined at an angle of between 58° and 72° with the horizontal and the diameters of the upper openings of said truncated cones are substantially uniform and at least three times the diameters of the lower openings of said cones, and the tops and bottom edges and top edges of adjacent cones are spaced from one another by a distance of approximately one-fourth the diameter of said bottom openings.

References Cited

UNITED STATES PATENTS

| 633,313 | 9/1899 | Weaver | 259—150 |
| 1,051,883 | 2/1913 | Hains | 259—150 |
| 3,275,304 | 9/1966 | Brundrett | 259—180 |
| 3,337,194 | 8/1967 | Zavasnik | 259—180 |

ROBERT W. JENKINS, Primary Examiner

UNITED STATES PATENT OFFICE
CERTIFICATE OF CORRECTION

Patent No. 3,536,303                                                   October 27, 1970

Jerry R. Johanson

It is certified that error appears in the above identified patent and that said Letters Patent are hereby corrected as shown below:

Column 3, line 8, "apparatus 8" should read -- apparatus 2 --; line 60, "H" should read -- N --.

Signed and sealed this 6th day of April 1971.

(SEAL)
Attest:

EDWARD M. FLETCHER, JR.                            WILLIAM E. SCHUYLER, JR.
Attesting Officer                                         Commissioner of Patents